(12) United States Patent  
Wangelien

(10) Patent No.: US 8,639,657 B2
(45) Date of Patent: Jan. 28, 2014

(54) REORGANIZING TABLE-BASED DATA OBJECTS

(75) Inventor: George G. Wangelien, Township of Washington, NJ (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/260,330

(22) Filed: Oct. 29, 2008

(65) Prior Publication Data

US 2010/0106749 A1 Apr. 29, 2010

(51) Int. Cl.
*G06F 7/00* (2006.01)
*G06F 17/00* (2006.01)

(52) U.S. Cl.
USPC .......................................................... 707/609

(58) Field of Classification Search
None
See application file for complete search history.

(56) References Cited

U.S. PATENT DOCUMENTS

| | | | |
|---|---|---|---|
| 5,933,820 A | 8/1999 | Beier et al. | |
| 6,944,630 B2 | 9/2005 | Vos et al. | |
| 6,996,576 B2 | 2/2006 | Vos et al. | |
| 7,302,449 B2 | 11/2007 | Vos et al. | |
| 2006/0080324 A1 | 4/2006 | Bower et al. | |
| 2006/0206507 A1* | 9/2006 | Dahbour | 707/100 |

OTHER PUBLICATIONS

Oracle Database SQL Reference 10g Release 2, Dec. 2005, Oracle, http://download.oracle.com/docs/cd/B19306_01/server.102/b14200/toc.htm.*
Oracle Database 2 Day + Perfomrance Tuning Guide 10g Release 2, Apr. 2010, Oracle, http://download.oracle.com/docs/cd/B19306_01/server.102/b28051/toc.htm.*
Oracle Databse Adminsitrator's Guide 10g Release 2, May 2006, Oracle, http://download.oracle.com/docs/cd/B19306_01/server.102/b14231/toc.htm.*
Setting Up Usage Tracking in Oracle BI EE, date unknown, Oracle, http://www.oracle.com/webfolder/technetwork/tutorials/obe/fmw/bi/biee/r1013/usage_tracking/usage_tracking.htm.*
Venkatakrishnan, Usage Tracking in OBI EE, Aug. 17, 2007, wordpress.com, http://oraclebizint.wordpress.com/2007/08/14/usagetracking-in-obi-ee/.*
Pay, Runstats in DB2 UDB Version 8.2, Dec. 2, 2004, IBM, http://www.ibm.com/developerworks/data/library/techarticle/dm-0412pay/.*
Using Oracle's Parallel Execution Features, date unknown, akadia.com, http://www.akadia.com/services/ora_parallel_processing.html.*
Script, date unknown, techterms.com, http://www.techterms.com/definition/script.*
Chan, Performance Tuning Guide Mar. 2008, Oracle, http://docs.oracle.com/cd/B19306_01/server.102/b14211/toc.htm.*

\* cited by examiner

*Primary Examiner* — Jason Liao
(74) *Attorney, Agent, or Firm* — John R. Pivnichny; Keohane & D'Alessandro, PLLC

(57) ABSTRACT

The present invention generally relates to reorganization of table-based data objects. In a typical embodiment, the present invention utilizes SQL based scripts to run and manage online "reorgs" on DB2® table data. Such reorgs can occur synchronously or asynchronously and typically include: defragmenting the data objects to reclaim free space; sorting the data objects according to an index; and/or eliminating overflow rows in order to improve data objects access performance. Also under the present invention, information pertaining to the reorg (e.g., status) will be collected. DB2® tables can be used to drive, control, manage and track the reorganization operation. Still yet, "runstat" maintenance can be performed against data objects affected by the reorgs.

16 Claims, 2 Drawing Sheets

REORGANIZING TABLE-BASED DATA OBJECTS

FIELD OF THE INVENTION

The present invention generally relates to reorganization of table-based data objects. Specifically, the present invention relates to the on-line "reorg" (synchronous or asynchronous) of data objects in DB2® tables (DB2, UDB and related terms are trademarks of IBM Corp. in the Unites States and/or other countries).

BACKGROUND OF THE INVENTION

DB2 has a utility called "reorg" that is used to maintain DB2® tables and indexes. Reorganization (i.e. "reorg") of data is a normal maintenance task performed by database administrators to keep the DB2® data (objects) organized. Reorgs are used to defragment data, reclaim free space, sort/order the data according to an index and eliminate overflow rows in order to improve data access performance. Although DB2® UDB® has automatic maintenance that performs reorgs (AUTO_REORG), the table reorgs are offline reorgs.

Online table reorgs run asynchronously, once the command is entered control is returned to the caller and the reorg command continues to run in the background. No notification is returned back to the caller that the online reorg completed successfully or not. This makes online reorgs difficult to manage at best.

SUMMARY OF THE INVENTION

The present invention generally relates to reorganization of table-based data objects. In a typical embodiment, the present invention utilizes SQL based scripts to run and manage online "reorgs" on DB2® table data. Such reorgs can occur synchronously or asynchronously and typically include: defragmenting the data objects to reclaim free space; sorting the data objects according to an index; and/or eliminating overflow rows in order to improve data objects access performance. Also under the present invention, information pertaining to the reorg (e.g., status) will be collected. DB2® tables can be used to drive, control, manage and track the reorganization operation. Still yet, "runstat" maintenance can be performed against data objects affected by the reorgs.

A first aspect of the present invention provides a method for reorganizing table-based data objects, comprising: identifying a set of database tables containing data objects; accessing a set of scripts; and performing the reorganization operation on the set of tables on-line using the set of scripts.

A second aspect of the present invention provides a system for reorganizing table-based data objects, comprising: a module for identifying a set of database tables containing data objects; a module for accessing a set of scripts; and a module for performing the reorganization operation on the set of tables on-line and in parallel using the set of scripts.

A third aspect of the present invention provides a computer readable medium containing a program product for reorganizing table-based data objects, the computer readable medium comprising program code for causing a computer system: identify a set of database tables containing data objects; access a set of scripts; and perform the reorganization operation on the set of tables on-line and in parallel using the set of scripts.

A fourth aspect of the present invention provides a method for deploying an application for reorganizing table-based data objects, comprising: deploying a computer infrastructure being operable to: identify a set of database tables containing data objects; access a set of scripts; and perform the reorganization operation on the set of tables on-line and in parallel using the set of scripts.

A fifth aspect of the present invention provides a computer-implemented method for reorganizing table-based data objects, comprising: identifying a set of database tables containing data objects; accessing a set of scripts; and performing the reorganization operation on the set of tables on-line using the set of scripts.

A sixth aspect of the present invention provides a data processing system for reorganizing table-based data objects, comprising: a memory medium comprising instructions; a bus coupled to the memory medium; and a processor coupled to the bus that when executing the instructions causes the data processing system a module for identifying a set of database tables containing data objects; a module for accessing a set of scripts; and a module for performing the reorganization operation on the set of tables on-line and in parallel using the set of scripts.

BRIEF DESCRIPTION OF THE DRAWINGS

These and other features of this invention will be more readily understood from the following detailed description of the various aspects of the invention taken in conjunction with the accompanying drawings in which.

Figure 1:
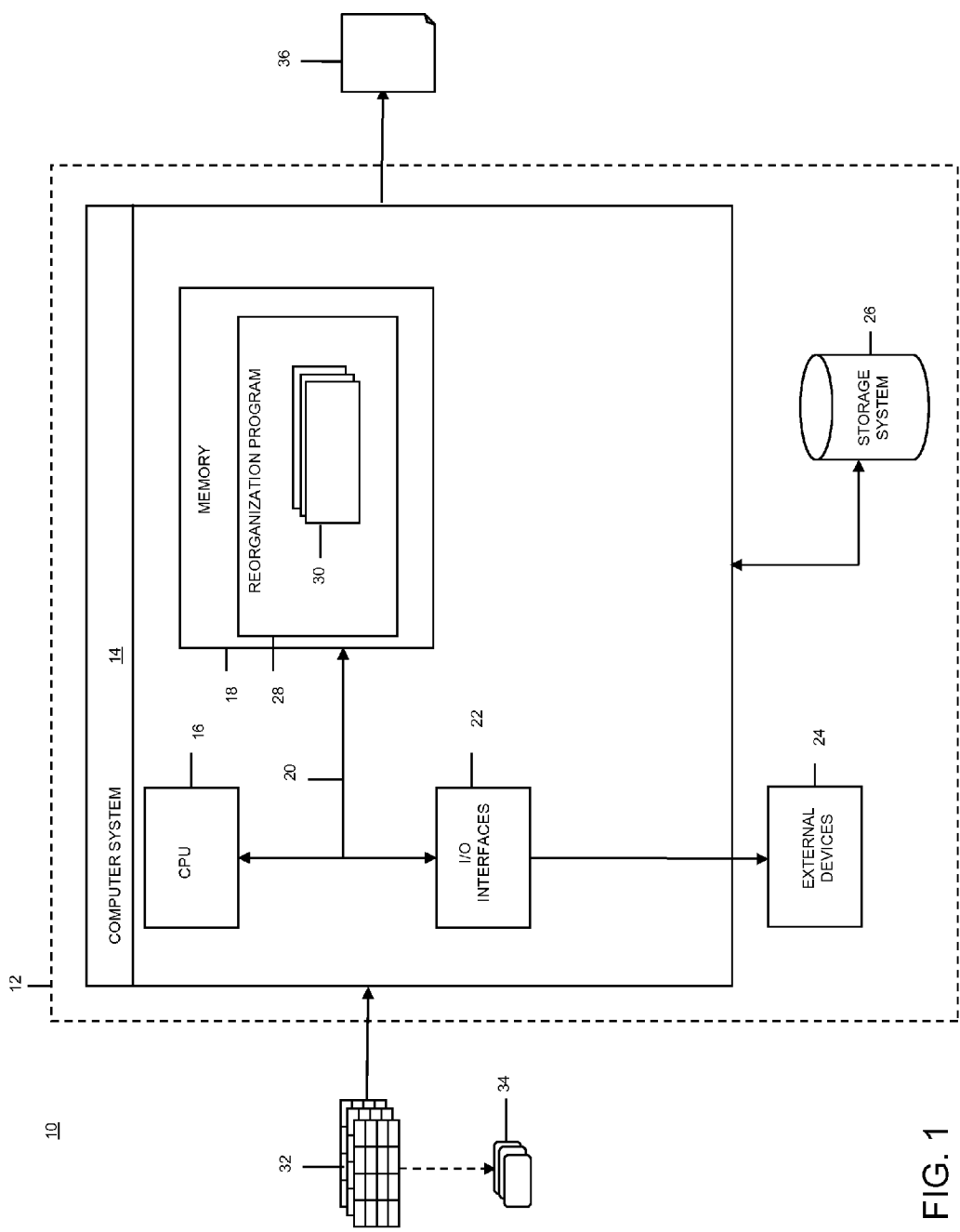
FIG. 1 shows a computerized implementation according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention generally relates to reorganization of table-based data objects. In a typical embodiment, the present invention utilizes SQL based scripts to run and manage online "reorgs" on DB2® table data. Such reorgs can occur synchronously or asynchronously and typically include: defragmenting the data objects to reclaim free space; sorting the data objects according to an index; and/or eliminating overflow rows in order to improve data objects access performance. Also under the present invention, information pertaining to the reorg (e.g., status) will be collected. DB2® tables can be used to drive, control, manage and track the reorganization operation. Still yet, "runstat" maintenance can be performed against data objects affected by the reorgs. It should be understood that although in a typical embodiment, the present invention utilizes DB2®, any database language, schema, program, etc. could utilize the teachings recited herein.

Figure 2:
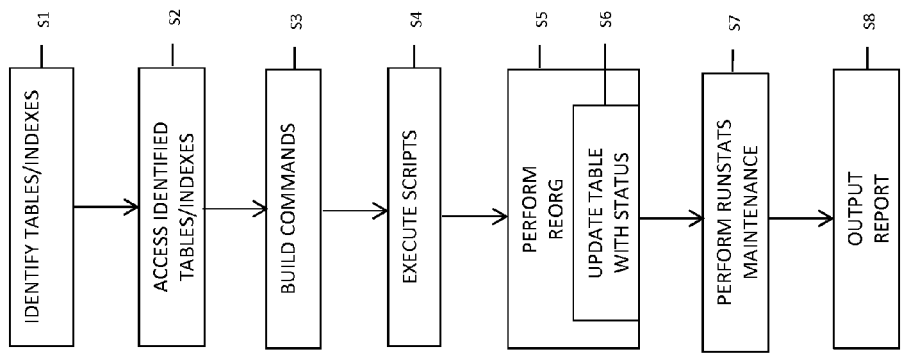
FIG. 2 shows method flow diagram according to the present invention.

These teachings will be described in further detail with respect to FIGS. 1 and 2, collectively. FIG. 1 shows a detailed diagram of a computerized implementation 10 of the present invention. As depicted, implementation 10 includes computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to implement, deploy, and/or perform the functions of the present invention for others.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as reorganization program 28, which is stored in memory 18 and/or storage system 16. While executing computer program code, processing unit 16 can read and/or write data to/from memory 18, and/or storage system 26. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to. Computer infrastructure 12 is only illustrative of various types of computer infrastructures for implementing the invention. For example, in one embodiment, computer infrastructure 12 comprises two or more computing devices (e.g., a server cluster) that communicate over a network to perform the process(es) of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 16 can comprise any combination of various types of data storage and/or transmission media that reside at one or more physical locations. Further, I/O interfaces 22 can comprise any system for exchanging information with one or more external device 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 14 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14. It should be understood computer system could be any combination of human, hardware and/or software. It is shown as such to illustrate the functions as described herein.

Shown in memory 18 of computer system 14 is reorganization program 28, which comprises a set of modules 30 that facilitates the functions described herein. It should be understood in advance that reorganization program 28 can be part of or work in conjunction with a database program such as DB2®. In any event, and with reference to FIGS. 1 and 2 collectively, in step S1 it is determined what database tables/indexes require a reorg/runstats. As shown in FIG. 1, database tables 32 include data objects 34. In a typical embodiment, database tables 32 are DB2® tables, and data objects 34 are DB2® data objects. Regardless, database tables 32 will be accessed in step S2. In step S3, a set of commands to be executed is built, and in S4, a set of (SQL) scripts is executed script to populate DB2® tables with required data. In general, DB2® tables holds data used to provide input, control command execution flow and hold status information. In step S5, the reorg operation is performed. In this step, a driver script is run to execute the command against one DB2® data object 34. Specifically, the set of scripts reads the command from the DB2® table and executes it. In general, the reorg operation typically includes the following: defragmenting the data objects to reclaim free space; sorting the data objects according to an index; and eliminating overflow rows in order to improve data objects access performance.

In any event, in step S6, each driver script updates the DB2® table with status information (start/end times, success/failure information). In step S7, runstats maintenance is performed against data objects affected by the reorganization operation. In optional step S8, a report 36 or the like can be output showing details of the reorg/runstats operation. It should be understood the process(es) of the present invention can be run online and either synchronously (in parallel) or asynchronously (in series). In the case of the former, multiple driver scripts can be run in parallel, allowing multiple commands to run concurrently and be managed in a controlled manor. It should further be understood that the set of modules can also schedule the commands so that when one operation completes the method will submit another command. Still yet, set of modules will also tracks and monitors the status of each reorg/runstats command (waiting to run, currently executing, completed successfully, failed, etc.).

Shown below is an illustrative script used to run online reorgs in parallel:
reorg_wrapper.ksh—Runs reorg_bulder, ksh, reorg_create_index_override.ksh and reorg_driver.ksh
reorg_builder.ksh—Creates reorg input.
Runs reorgchk, puts reorgcchk data into two tables (db2tools.reorgchk_tables and db2tools,reorgchk_indexes).
Poulates db2tools.reorg table with commands use to reorg/runstat tables reorg_create_index_override.ksh—Populates db2tools,index table to reorg tables with proper db2 indexes (PS_*)
reorg_driver.ksh—Executes the reorg commands
reorg_common.ksh—Common program functions
reorg_bkp_overlap.ksh—Script attempts to check for backups and reorgs running concurrently While shown and described herein as a method and system for reorganizing table-based data objects, it is understood that the invention further provides various alternative embodiments. For example, in one embodiment, the invention provides a computer-readable/useable medium that includes computer program code to enable a computer infrastructure to reorganize table-based data objects. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to reorganize table-based data objects. In this case, the service provider can create, maintain, support, etc., a computer infrastructure, such as computer infrastructure 12 (FIG. 1) that performs the process of the invention for one or more customers. In return, the service provider can receive payment from the customer (s) under a subscription and/or fee agreement and/or the service provider can receive payment from the sale of advertising content to one or more third parties.

In still another embodiment, the invention provides a computer-implemented method for reorganizing table-based data objects. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method for reorganizing table-based data objects, comprising:
   identifying a set of database tables containing data objects;
   accessing a set of scripts; and
   performing the reorganization operation on the set of tables on-line and in parallel using the set of scripts, the reorganization operation comprising:
   reading and interpreting the set of scripts and collecting information pertaining to status of said reading and interpreting;
   defragmenting the data objects to reclaim free space and collecting information pertaining to status of said defragmenting;
   sorting the data objects according to an index and collecting information pertaining to status of said sorting;
   eliminating overflow rows in order to improve data objects access performance and collecting information pertaining to status of said eliminating;
   performing runstat maintenance immediately following the performing of the reorganization operation against data objects affected by said reorganization operation; and
   using said collected information pertaining to status of said reading and interpreting, status of said defragmenting, status of said sorting and status of said eliminating to drive, control, manage and track the reorganization operation.

2. The method of claim 1, further comprising displaying information pertaining to status of the reorganization operation.

3. The method of claim 1, the set of tables undergoing the reorganization operation synchronously.

4. The method of claim 1, the set of tables undergoing the reorganization operation asynchronously.

5. The method of claim 1, further comprising using tables of relational database to drive, control, manage and track the reorganization operation.

6. The method of claim 1, the set of scripts being structured query language based.

7. A computer system for reorganizing table-based data objects, comprising:
   at least one processing unit;
   memory operably associated with the at least one processing unit; and
   a reorganizing program storable in memory and executed by the at least one processing unit, the reorganizing program configured for:

identifying, via the at least one processing unit, a set of database tables containing data objects;
accessing, via the at least one processing unit, a set of scripts; and
performing, via the at least one processing unit, the reorganization operation on the set of tables on-line and in parallel using the set of scripts, the reorganization operation comprising:
reading and interpreting the set of scripts and collecting information pertaining to status of said reading and interpreting;
defragmenting the data objects to reclaim free space and collecting information pertaining to status of said defragmenting;
sorting the data objects according to an index and collecting information pertaining to status of said sorting;
a module for eliminating overflow rows in order to improve data objects access performance and collecting information pertaining to status of said eliminating;
performing runstat maintenance immediately following the performing of the reorganization operation against data objects affected by said reorganization operation; and
using said collected information pertaining to status of said reading and interpreting, status of said defragmenting, status of said sorting and status of said eliminating to drive, control, manage and track the reorganization operation.

8. The computer system of claim 7, the reorganizing program further configured for displaying information pertaining to status of the reorganization operation.

9. The computer system of claim 7, the reorganizing program further configured for using tables of relational database to drive, control, manage and track the reorganization operation.

10. The computer system of claim 7, the set of scripts being structured query language based.

11. A computer readable medium containing a program product for reorganizing table-based data objects, the computer readable medium comprising program code for causing a computer system:
identify a set of database tables containing data objects;
access a set of scripts; and
perform the reorganization operation on the set of tables on-line and in parallel using the set of scripts, the reorganization operation comprising:
reading and interpreting the set of scripts and collecting information pertaining to status of said reading and interpreting;
defragmenting the data objects to reclaim free space and collecting information pertaining to status of said defragmenting;
sorting the data objects according to an index and collecting information pertaining to status of said sorting;
eliminating overflow rows in order to improve data objects access performance and collecting information pertaining to status of said eliminating;
performing runstat maintenance immediately following the performing of the reorganization operation against data objects affected by said reorganization operation; and
using said collected information pertaining to status of said reading and interpreting, status of said defragmenting, status of said sorting and status of said eliminating to drive, control, manage and track the reorganization operation.

12. The computer readable medium containing the program product of claim 11, the computer readable medium further comprising program code for causing the computer system to display information pertaining to the status of the reorganization operation.

13. The computer readable medium containing a program product of claim 12, the information comprising a status of the reorganization operation.

14. The computer readable medium containing the program product of claim 11, the computer readable medium further comprising program code for causing the computer system to use DB2 tables of relational database to drive, control, manage and track the reorganization operation.

15. The computer readable medium containing the program product of claim 11, the set of scripts being structured query language based.

16. A method for deploying an application for reorganizing table-based data objects, comprising:
deploying a computer infrastructure being operable to:
identify a set of database tables containing data objects;
access a set of scripts; and
perform the reorganization operation on the set of tables on-line and in parallel using the set of scripts, the reorganization operation comprising:
reading and interpreting the set of scripts and collecting information pertaining to status of said reading and interpreting;
defragmenting the data objects to reclaim free space and collecting information pertaining to status of said defragmenting;
sorting the data objects according to an index and collecting information pertaining to status of said sorting;
eliminating overflow rows in order to improve data objects access performance and collecting information pertaining to status of said eliminating;
performing runstat maintenance immediately following the performing of the reorganization operation against data objects affected by said reorganization operation; and
using said collected information pertaining to status of said reading and interpreting, status of said defragmenting, status of said sorting and status of said eliminating to drive, control, manage and track the reorganization operation.

* * * * *